United States Patent
Chinnamani et al.

(10) Patent No.: US 9,378,038 B2
(45) Date of Patent: *Jun. 28, 2016

(54) METHODS, DEVICES AND COMPUTER READABLE STORAGE DEVICES FOR EMULATING A GYROSCOPE IN A GUEST OPERATING SYSTEM FROM A HOST OPERATING SYSTEM

(71) Applicant: American Megatrends, Inc., Norcross, GA (US)

(72) Inventors: Sripriyan Chinnamani, Duluth, GA (US); Vinothkumar Sundaramoorthy, Lawrenceville, GA (US); Govind Kothandapani, Snellville, GA (US); Anbarasu Sethupandian, Suwanee, GA (US); Rajasekhar Jonna, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 63 days.

This patent is subject to a terminal disclaimer.

(21) Appl. No.: 14/290,605

(22) Filed: May 29, 2014

(65) Prior Publication Data

US 2014/0366023 A1   Dec. 11, 2014

Related U.S. Application Data

(63) Continuation-in-part of application No. 14/155,471, filed on Jan. 15, 2014.

(60) Provisional application No. 61/832,300, filed on Jun. 7, 2013.

(51) Int. Cl.
*G06F 9/46* (2006.01)
*G06F 9/455* (2006.01)

(52) U.S. Cl.
CPC .. *G06F 9/45545* (2013.01); *G06F 2009/45579* (2013.01)

(58) Field of Classification Search
CPC .............. G06F 9/4881; G06F 9/45545; G06F 2009/45579
See application file for complete search history.

(56) References Cited

U.S. PATENT DOCUMENTS

| | | | |
|---|---|---|---|
| 6,996,828 B1 | 2/2006 | Kimura | |
| 8,863,123 B2 | 10/2014 | Jung | |

(Continued)

OTHER PUBLICATIONS

Chinnamani et al. "Methods, Devices and Computer Readable Storage Devices for Emulating an Accelerometer in a Guest Operating System from a Host Operating System", U.S. Appl. No. 14/290,505, filed May 29, 2014.

(Continued)

*Primary Examiner* — Camquy Truong
(74) *Attorney, Agent, or Firm* — Gardner Groff Greenwald & Villanueva, P.C.

(57) ABSTRACT

A guest operating system, launched by executing an application associated with a host operating system, is provided with access to a gyroscope associated with a computing device including a processor executing the host operating system. A first application associated with the guest operating system generates a request for gyroscope data. The request is received at a hardware abstraction layer associated with the guest operating system, and the request is sent from the hardware abstraction layer to a second application associated with the host operating system. The request is sent from the second application to a driver executing within a kernel of the host operating system. The driver retrieves the requested gyroscope data from the gyroscope. The retrieved gyroscope data is provided to the first application via the second application and the hardware abstraction layer.

17 Claims, 3 Drawing Sheets

(56) References Cited

U.S. PATENT DOCUMENTS

| | | | |
|---|---|---|---|
| 2002/0194241 A1 | 12/2002 | Griffin | |
| 2003/0037089 A1 | 2/2003 | Cota-Robles | |
| 2004/0123103 A1 | 6/2004 | Risan | |
| 2005/0015702 A1 | 1/2005 | Shier | |
| 2006/0146057 A1 | 7/2006 | Blythe | |
| 2006/0150183 A1 | 7/2006 | Chinya | |
| 2006/0206904 A1 | 9/2006 | Watkins | |
| 2007/0294690 A1 | 12/2007 | Taillefer | |
| 2007/0300221 A1 | 12/2007 | Hartz | |
| 2009/0083630 A1 | 3/2009 | Peterson | |
| 2009/0328074 A1 | 12/2009 | Oshins | |
| 2010/0103186 A1 | 4/2010 | Luengen | |
| 2010/0107163 A1 | 4/2010 | Lee | |
| 2010/0118169 A1* | 5/2010 | Yu | H04N 5/23203 348/294 |
| 2010/0138685 A1 | 6/2010 | Kass | |
| 2010/0146504 A1 | 6/2010 | Tang | |
| 2011/0061053 A1 | 3/2011 | Coppinger | |
| 2011/0093836 A1 | 4/2011 | Galicia | |
| 2012/0072923 A1 | 3/2012 | Robles | |
| 2012/0089992 A1* | 4/2012 | Reeves | G06F 3/1431 719/318 |
| 2012/0124595 A1 | 5/2012 | Hsu | |
| 2012/0138685 A1 | 6/2012 | Qu | |
| 2012/0206331 A1* | 8/2012 | Gandhi | G06F 9/445 345/156 |
| 2012/0296626 A1 | 11/2012 | Bond | |
| 2013/0031592 A1 | 1/2013 | Choi | |
| 2013/0061250 A1 | 3/2013 | Kothandapani | |
| 2013/0185716 A1 | 7/2013 | Yin | |
| 2013/0219086 A1 | 8/2013 | Hu | |
| 2013/0226505 A1 | 8/2013 | Kelly | |
| 2013/0326508 A1 | 12/2013 | Tsirkin | |

OTHER PUBLICATIONS

Chinnamani et al. "Methods, Devices and Computer Readable Storage Devices for Emulating a Magnetometer in a Guest Operating System from a Host Operating System", U.S. Appl. No. 14/290,562, filed May 29, 2014.

Chinnamani et al. "Methods, Devices and Computer Readable Storage Devices for Emulating a Light Sensor in a Guest Operating System from a Host Operating System", U.S. Appl. No. 14/290,656, filed May 29, 2014.

Chinnamani et al. "Methods, Devices and Computer Readable Storage Devices for Emulating Rotation Events in a Guest Operating System from a Host Operating System", U.S. Appl. No. 14/290,702, filed May 29, 2014.

Jie Song; "The Design of Bottom Layer Sensor Interfaces Based on Andriod OS", 2012 4th International Conference on Signal Processing Systems, Singapore (Song_2012.pdf; pp. 1-7).

STMicroelectronics; "Hardware abstraction layer for Android", Sep. 2012; (Sensor_HAL_2012.pdf; pp. 1-12).

Benjamin Zores; "Jelly Bean Device Porting Walkthrough" Alcatel-Lucent, 181h Feb. 2013, (ALCATEL-LUCENT_2013.pdf; pp. 1-127).

Kaur et al.; "Exposing the Android Camera Stack" Aptina Imaging Corporation Aug. 28, 2012; (Kaur_2012.pdf; pp. 1-68).

Architecture of Windows NT, http://en.wikipedia.orgfwikifArchitecture_of_Windows_NT, 9 pp (Printed Aug. 9, 2011).

Android Architecture, http://blog.zeustek.com/2010/11/11/android-architecture, 6 pp (Printed Jul. 14, 2011 ).

Ammann, Paul T., "Windows 200 Architecture", www.infonnit.comfarticles, 3pp (Apr. 13, 2001).

Wright, Maury, "V1/'ny Android Deserves a Look in Embedded Wireless Systems", www.digkey.com, 2pp (Printed Jul. 1, 2011).

Levent-Levi, Tsahi, "iOS, Android, Windows Phone 7 and the Great Changes in the Operating Systems Market", http://blog.radvision.com/voipsurvivor, 5pp (Oct. 7, 2010).

Woods, Ben, "Hands-on with Samsung's hybrid Windows 8 and Android Galaxy ATIV Q", http://thenextweb.com, 3 pp (Jun. 21, 2013}.

BlueStacks—Technology, www.bluestacks.com/technology, 3pp (Printed Jul. 15, 2013).

Samsung Strengthens Tablet Business and Demonstrates Commitment to Customer Choice with Innovative New ATIV Tablets, www.samsung.com, 2pp (Printed Jul. 15, 2013}.

Kothandapani el al., U.S. Appl. No. 14/155,471, filed Jan. 15, 2014 entitled Methods, Devices D and Computer Readable Storage Devices for Confluence of Multiple Operating Systems.

* cited by examiner

METHODS, DEVICES AND COMPUTER READABLE STORAGE DEVICES FOR EMULATING A GYROSCOPE IN A GUEST OPERATING SYSTEM FROM A HOST OPERATING SYSTEM

CROSS REFERENCE TO RELATED APPLICATIONS

This application claims priority to U.S. Provisional Appl. No. 61/832,300, filed Jun. 7, 2013, and herein incorporated by reference. In addition, this application claims priority as a Continuation-in-part of U.S. patent application Ser. No. 14/155,471, filed Jan. 15, 2014, and herein incorporated by reference.

TECHNICAL FIELD

The present disclosure relates generally to computing systems, and more particularly, to providing a guest operating system with access to a gyroscope on a computing device.

BACKGROUND

A tablet computer, which may be simply referred to as a tablet, is a one-piece mobile computer. Tablet computers typically offer a touchscreen, with finger (or stylus) gestures acting as the host means of user interface control. The tablet may be supplemented with one or more physical context sensitive buttons or the input from one or more sensors, e.g., gyroscopes, as a means for control. An on-screen, hideable virtual keyboard is generally offered as the principal means of data input. Though available in a variety of sizes, tablets customarily offer a screen diagonal greater than 7 inches (18 cm), differentiating the tablets through size from functionally similar smart phones or personal digital assistants.

Most tablets have built-in sensors that measure motion, orientation, and various environmental conditions. These sensors are capable of providing raw data with high precision and accuracy and are useful for monitoring three-dimensional device movement or positioning or monitoring changes in the ambient environment near a device. For example, a game running on a tablet might track readings from the tablet's gravity sensor and/or other sensors, e.g., a gyroscope, to infer complex user gestures and motions, such as tilt, shake, rotation, or swing. Likewise, a weather application might use the tablet's temperature sensor and humidity sensor to calculate and report the dew point, or a travel application might use the tablet's geomagnetic field sensor and gyroscope to report a compass bearing.

In today's world, having dual mobile operating systems in devices, such as laptops, has become more common as people want to have access to features of multiple operating systems. Windows has been the host operating system for most laptops, along with Linux based operating systems. Recently, with the increase in popularity of Android in smartphones, a trend is emerging pushing Android as a guest operating systems in tablets, notebooks and netbooks. Since Android has the advantage of a mature application market, along with developer support, there is an increasing push from the market to run Android in parallel with Windows.

The Android OS platform supports three broad categories of sensors: environmental sensors, position sensors, and motion sensors. Environmental sensors measure various environmental parameters, such as ambient air temperature and pressure, illumination, and humidity. Environmental sensors include, e.g., barometers, photometers, and thermometers. Position sensors measure the physical position of a device. Position sensors include, e.g., orientation sensors and magnetometers. Motion sensors measure acceleration forces and rotational forces along three axes. Motion sensors include, e.g., gyroscopes, gravity sensors, gyroscopes, and rotational vector sensors.

A Dual Operating System (DUOS) allows an Android OS to work alongside a host OS, e.g., a Windows OS, in a tablet and other types of computing devices, e.g., mobile communication devices, personal digital assistants, and personal computers. DUOS enables the user of a Windows OS computing device to run an Android OS in the same computing device and to use the thousands of applications available in Android. Details of exemplary DUOS devices are provided in U.S. patent application Ser. No. 13/233,473, filed Sep. 2, 2011 and U.S. patent application Ser. No. 14/155,471, filed Jan. 15, 2014, herein incorporated by reference.

In an Android operating system that is not part of a DUOS computing device, an Android application sends requests for access to the hardware, and the requests are fulfilled by the Linux drivers.

However, in existing DUOS computing devices, in which the Android OS is executed as a guest of the Windows OS, when the Window OS boots the computing device, the Windows OS enumerates and takes over the hardware. Later, when DUOS is launched from within the Windows OS, the Android OS is run in the Windows OS as a process. An attempt by an Android application to access the hardware through Linux drivers in such a device would fail as it would be transparent to the Windows OS, because such access is outside of the scope of the Windows OS.

It is with respect to these and other considerations that the disclosure presented herein has been made.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

According to an illustrative embodiment, a method is provided for providing a guest operating system with access to a gyroscope associated with a computing device including a processor executing a host operating system. The method includes generating a request for gyroscope data by a first application associated with the guest operating system. The guest operating system is launched as a virtual operating system and executed as a guest of the host operating system. The method further includes receiving the request at a hardware abstraction layer associated with the guest operating system and sending the request from the hardware abstraction layer associated with the guest operating system to a second application executed by the processor in a user mode layer associated with the host operating system. The method further includes ending the request from the second application to a driver executing within a kernel of the host operating system. The driver retrieves the requested gyroscope data from the gyroscope. The method further includes providing the requested gyroscope data to the first application via the second application and the hardware abstraction layer.

According to another embodiment, a computing device includes a processor and a memory. The memory has instructions stored thereon which, when executed by the processor, cause the processor to perform operations. The operations include executing a host operating system and executing an application for launching a guest operating system. The guest operating system is a virtual operating system and is executed as a guest of the host operating system. The operations further include generating a request for gyroscope data by a first application associated with the guest operating system. The operations further include receiving the request at a hardware abstraction layer associated with the guest operating system and sending the request from the hardware abstraction layer associated with the guest operating system to a second application executed by the processor in a user mode layer associated with the host operating system. The operations further include sending the request from the second application to a driver executing within a kernel of the host operating system. The driver retrieves the requested gyroscope data from the gyroscope. The operations further include providing the requested gyroscope data to the first application via the second application and the hardware abstract layer.

According to another embodiment, a computer readable storage device has instructions stored thereon which, when executed by a processor, cause the processor to perform operations. The operations include executing a host operating system and executing an application for launching a guest operating system. The guest operating system is a virtual operating system and is executed as a guest of the host operating system. The operations further include generating a request for gyroscope data by a first application associated with the guest operating system. The operations further include receiving the request at a hardware abstraction layer associated with the guest operating system and sending the request from the hardware abstraction layer associated with the guest operating system to a second application executed by the processor in a user mode layer associated with the host operating system. The operations further include sending the request from the second application to a driver executing within a kernel of the host operating system. The driver retrieves the requested gyroscope data from the gyroscope. The operations further include providing the requested gyroscope data to the first application via the second application and the hardware abstract layer.

DETAILED DESCRIPTION

Detailed illustrative embodiments are disclosed herein. It must be understood that the embodiments described and illustrated are merely examples that may be embodied in various and alternative forums, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

Although this disclosure refers to a tablet, it should be appreciated that the embodiments described herein may be applicable to any mobile computing device having built-in sensors, such as a gyroscope. A gyroscope measures a rate of rotation of a device, such as a mobile computing device, in rad/s around each of the three physical axes (x, y, and z). A gyroscope may be used by a rotation detection application to detect spin, turn, etc., of the mobile computing device.

Figure 1:
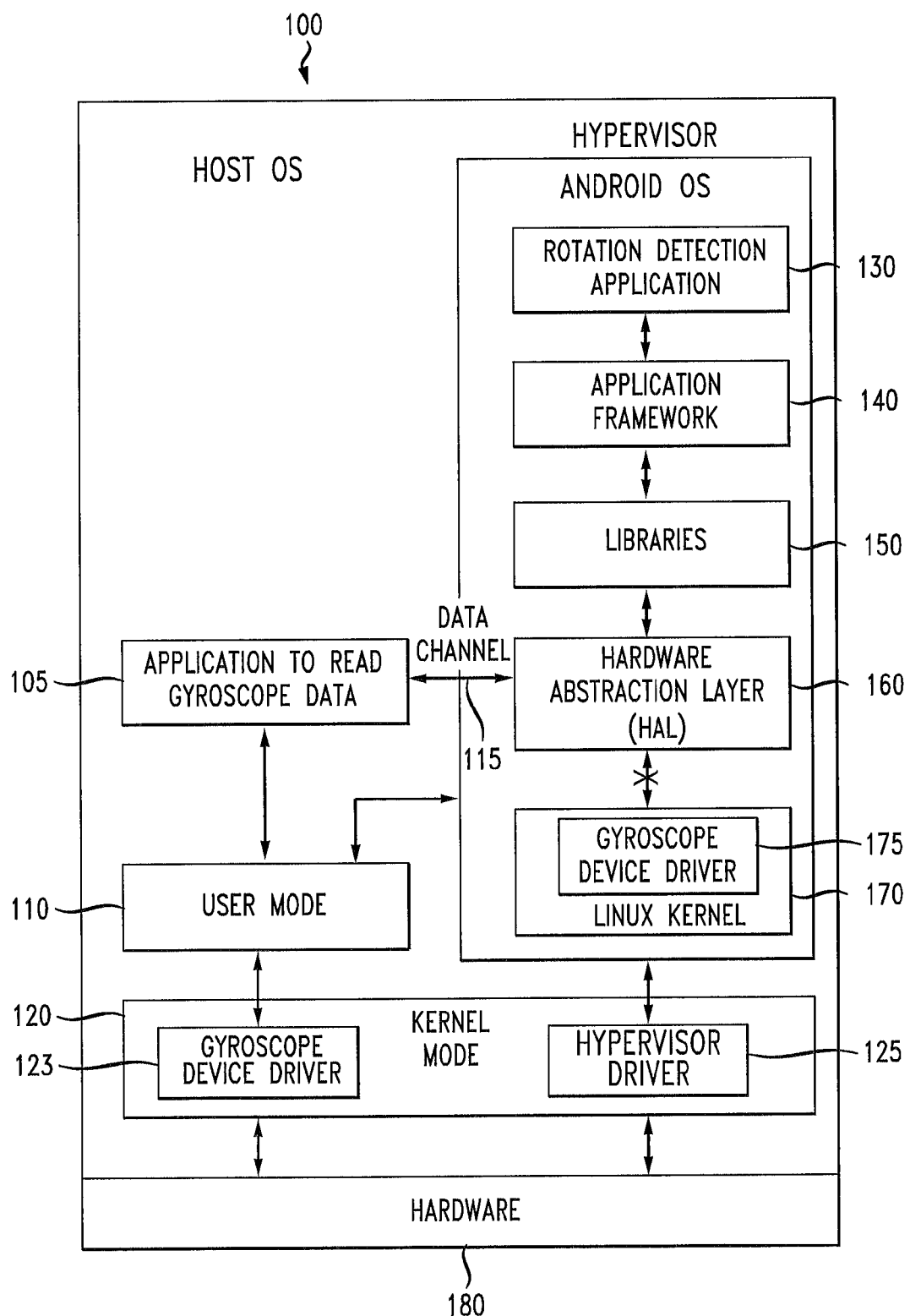
FIG. 1 is a diagram of a dual operating system architecture for emulating a gyroscope in a guest operating system from a host operating system according to illustrative embodiments.

FIG. 1 illustrates a DuOS architecture 100 for emulating a gyroscope in a guest operating system from a host operating system according to an illustrative embodiment. The DuOS architecture 100 includes guest operating system architecture (in this example Android architecture) and host operating system architecture (in this example Windows architecture). The Windows architecture shown in FIG. 1 represents an example of a Windows 8 operating system. However, it should be appreciated that the other versions of Windows are contemplated.

The Windows architecture operates in two modes. These two modes are represented in FIG. 1 as the kernel mode 120 and the user mode 110. The user mode includes user applications, such as Win32 applications, Windows 3.1, MS-DOS, POSIX, OS/2 applications, etc. The applications may also include various other user applications, e.g., applications to read data from sensors built into the computing device, such as an application 105 to read gyroscope data. Although shown as being separate from the user mode 110 for ease of understanding, it should be appreciated that the applications are included in the user mode 110.

The user mode 110 may also include a Windows Application Programming Interface (API) (not shown for simplicity of illustration). The Windows API may provide access to services, such as sensor services, control services and metro shortcut services.

In the user mode, software is not able to access the hardware 180 directly. Access to hardware is provided to the user mode 110 via the kernel mode 120. In the kernel mode 120, software is able to access the hardware and system data, as well as access all other system resources, including sensors.

The kernel mode 120 may include exported driver support routines including the operating system kernel (also referred to as the microkernel), file system drivers, other kernel-mode drivers, such as a sensor driver 123, and a Windows hardware abstraction layer (HAL). The file system drivers and the other kernel-mode drivers enable the kernel layer 120 to interact with the hardware layer 180 via the Windows hardware abstraction layer.

Although not shown in the interest of simplicity of illustration, it should be appreciated that the kernel mode 120 may also include additional components, e.g., executive layer components. These components may include components that implement memory management, process and thread management, security, I/O, interprocess communication, and other base operating system services.

The Windows hardware abstraction layer includes code associated with the Windows operating system that changes with the hardware that the operating system is being run on. Thus, it is compatible with multiple processor platforms. The Windows hardware abstraction layer manipulates the hardware 180 directly.

The hardware layer 180 includes physical hardware including, e.g., a hard drive for storing data, a processor for executing applications, and a memory which may include an operating system which controls scheduling of tasks and access to system resources. The physical hardware also includes sensors, such as a gyroscope.

The Android architecture depicted in FIG. 1 represents a virtual operating system that is launched by executing be a Windows application which may be referred to as virtual software or a hypervisor. Executing the hypervisor creates an instance of a virtual machine on which a guest operating system, e.g., an Android OS, can be run in a manner that is transparent to the end user. The hypervisor operates in the user mode and cannot access hardware directly. Thus, a hypervisor driver 125 is included in the kernel mode 120 to provide low-level hardware access for the Android OS for execution of machine level instructions.

As shown in FIG. 1, the Android OS includes a software stack including an applications layer 130, an application framework layer 140, a libraries layer 150, a hardware abstraction layer (HAL) 160, and a kernel layer 170. The applications layer 130 includes various applications, which may be written in JAVA.

The application framework 140 is used by developers to access framework application programming interfaces (APIs) and manage the basic functions of a mobile device, laptop, or tablet on which Android is executed, such as resource allocation, switching between processes or programs, phone applications, and keeping track of the physical location of the phone/laptop/tablet. The application framework 140 includes various managers, including an activity manager, a window manager, a content provider manager, a view system manager, a package manager, a telephony manager, a resource manager, a location manager, and a notification manager.

The library layer 150 includes libraries written, e.g., in C, C++, etc., and is used by various systems. The libraries instruct the device executing Android how to handle different kinds of data and are exposed to Android developers via the application framework 140. Libraries may include, e.g., a surface manager, a media framework library, an SQLite library, an Open GL/ES library, a Free Type library, a WebKit library, an SGL library, an SSL library, and an libc library.

An Android runtime layer, which includes a set of core libraries and a Dalvik Virtual Machine (DVM), may also be located in the library layer 150. The runtime layer includes the set of base libraries that are required for JAVA libraries.

The hardware abstraction layer 160 provides a standard way to create software hooks in between the Android platform stack and the hardware 180. The hardware abstraction layer 160 also acts as an abstraction layer between the hardware 180 and the rest of the software stack.

The Linux kernel layer 170 includes Android memory management programs, security settings, power management software and several drivers, such as the device driver 175 for hardware, file system access, networking, and inter-process-communication.

According to an illustrative embodiment, a request from a Windows application, e.g., application 105, is routed to the driver in the kernel mode which accesses the hardware 180. In general, an Android application running on an Android device that uses a sensor reads the sensor data using the Linux drivers of the Android device.

However, as noted above, when DUOS is launched from within the Windows OS, the Android OS is run in the Windows OS as a process. Any attempt by an Android application to access the hardware 180 through the Linux drivers 175 in such a device would be transparent to the Windows OS, because such access is outside of the scope of the Windows OS. Thus, a request for data from an Android application 130 would not be sent from the HAL 160 to the Linux kernel 170, as represented by the "X" in FIG. 1, and the Linux kernel drivers 175 would be unable to fulfill the request. This would result in an undefined state or malfunctioning of the hardware, According to an illustrative embodiment, a request for access to the hardware 180 by an Android application, such as a request from the motion detection application 130 or other Android application to read gyroscope data, is not routed to the Linux kernel 170. Rather, the request is routed to the Windows application 105 via the application framework 140, the libraries 150, the HAL 160 and a data channel 115. The data channel 115 may be implemented with a bus, a pipe, a message queue, a file, a shared memory, a socket, etc. The data channel 115 enables a request from an Android application to be relayed to the application 105.

The application 105 is an application associated with the Windows OS, which is executed by the processor in a user mode layer associated with the host Windows OS. Through the application 105, applications of the Android operating system are able to access the hardware and system data of the Windows OS, including a built-in sensor, such as n gyroscope.

The request received via the data channel 115 is forwarded from the Windows application 105 to a driver in the kernel mode 120, such as the gyroscope driver 123. The driver, in turn accesses the hardware 180, including, e.g., the accelerator via a hardware abstraction layer of the Windows OS. The gyroscope data is read and sent back to the Windows application 105 via the driver in the kernel mode 120. The gyroscope data is, in turn, sent to the Android application 130 that requested the gyroscope data via the data channel 115, the HAL 160, the libraries 150, and the application framework 140. Once the gyroscope data is made available to the HAL 160, the other higher level layers, including the libraries 150 and the application framework 140 work as expected.

As noted above, the architecture 100 may be included in a device, such as a tablet. However, the architecture may also be included in other devices, e.g., a workstation, a telephone, a desktop computer, a laptop, a notebook computer, a server, a handheld computer, a media playing device, a gaming system, a mobile computing device, or any other type and/or form of computing, telecommunications, or media device that is capable of communication.

Figure 2:
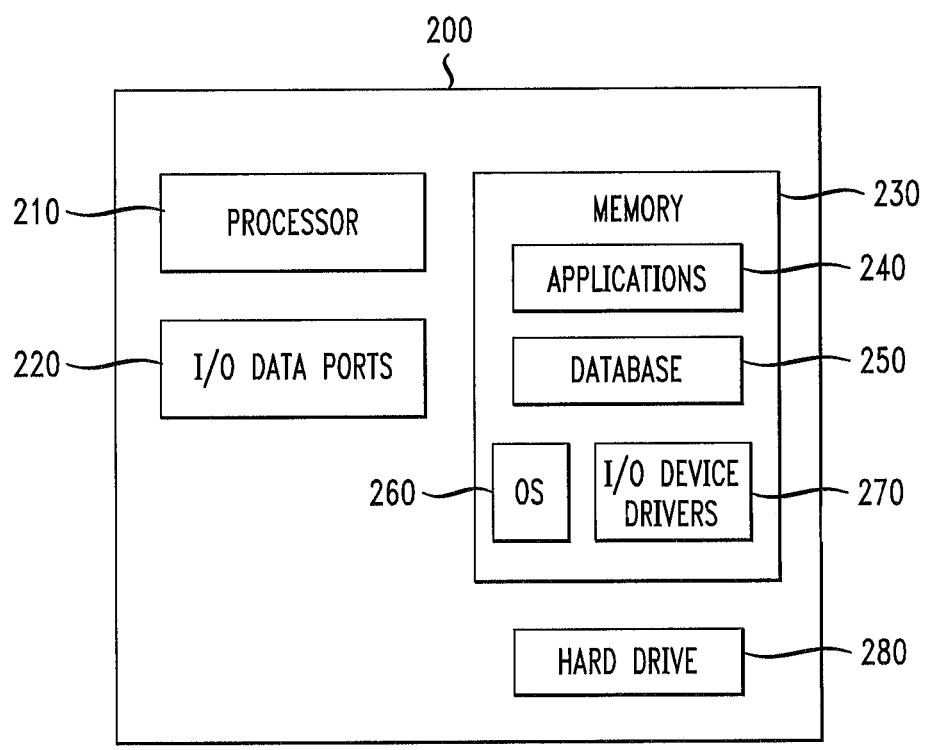
FIG. 2 is a block diagram of a computing device with which illustrative embodiments may be implemented.

FIG. 2 is a block diagram of a computing device 200 with which the software architecture of FIG. 1 may be implemented. The computing device 200 may be included within a device, such as a notebook or tablet. Referring to FIG. 2, the computing device 200 includes a processor 210 that receives inputs, e.g., user requests, and transmits outputs, e.g., responses to user requests via I/O Data Ports 220. The I/O Data Ports 220 can be implemented with, e.g., an interface through which data and signals may be transmitted and received wired and/or wirelessly.

The computing device 200 also includes a physical hard drive 280. The processor 210 communicates with the memory 230 and the hard drive 280 via, e.g., an address/data bus (not shown). The processor 210 can be any commercially available or custom microprocessor. The memory is 230 is representative of the overall hierarchy of memory devices containing the software and data used to implement the functionality of the device 200. The memory 230 can include, but is not limited to, the following types of devices: processor registers, processor cache, RAM, ROM, PROM, EPROM, EEPROM, flash memory, SRAMD, DRAM other volatile memory forms, and non-volatile, semi-permanent or permanent memory types, excluding propagating signals. For example, the memory may include tape-based media, optical media, solid state media, hard disks, combinations thereof, and the like.

As shown in FIG. 2, the memory 230 may include several categories of software and data used in the device 200, including applications 240, a database 250, an operating system (OS) 260, and input/output (I/0) device drivers 270. The applications 240 include various programs that implement the various features of the device 200, including, e.g., a hypervisor for emulating physical hardware to a virtual operating system acting a guest operating system, e.g., the Android OS. The applications 240 may also include user applications, e.g., an application for requesting gyroscope data, and other applications. The memory 230 may also include services, which may be considered a special category of applications 240.

As will be appreciated by those skilled in the art, the OS 260 may include code for any operating system for use with a data processing system, e.g., a Windows OS. According to an illustrative embodiment, the Windows OS is the run as the host operating system, while an Android OS is run as a virtual operating system acting as a guest of the host operating system. The Android OS is launched by executing a hypervisor application. The Android OS may be stored as a file within the memory 230. The Android OS file is emulated as a hard disk for the guest operating system. Running the Android OS using virtualization ensures that portions of the Android OS that need to run in a system mode, e.g., the kernel and the device driver, are run in the system mode of the host OS (in this case the Windows OS).

The I/O device drivers 270 may include various routines accessed through the OS 260 by the applications to communicate with devices and certain memory components. According to an illustrative embodiment, the device drivers may include, e.g., a driver for accessing a gyroscope (not shown in FIG. 2 for simplicity of illustration).

The applications 240 can be stored in the memory 230 and/or in a firmware (not shown) as executable instructions, and can be executed by the processor 210. The database 250 represents the static and dynamic data used by the applications 240, the OS 260, the I/O device drivers 270 and other software programs that may reside in the memory.

It should be understood that FIG. 2 and the description above are intended to provide a brief, general description of a suitable environment in which the various aspects of some embodiments of the present disclosure can be implemented. While the description refers to computer-readable instructions, the present disclosure also can be implemented in combination with other program modules and/or as a combination of hardware and software in addition to, or instead of, computer readable instructions. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like. The terminology "computer-readable media", "computer-readable storage device" and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information, excluding propagating signals.

Figure 3:
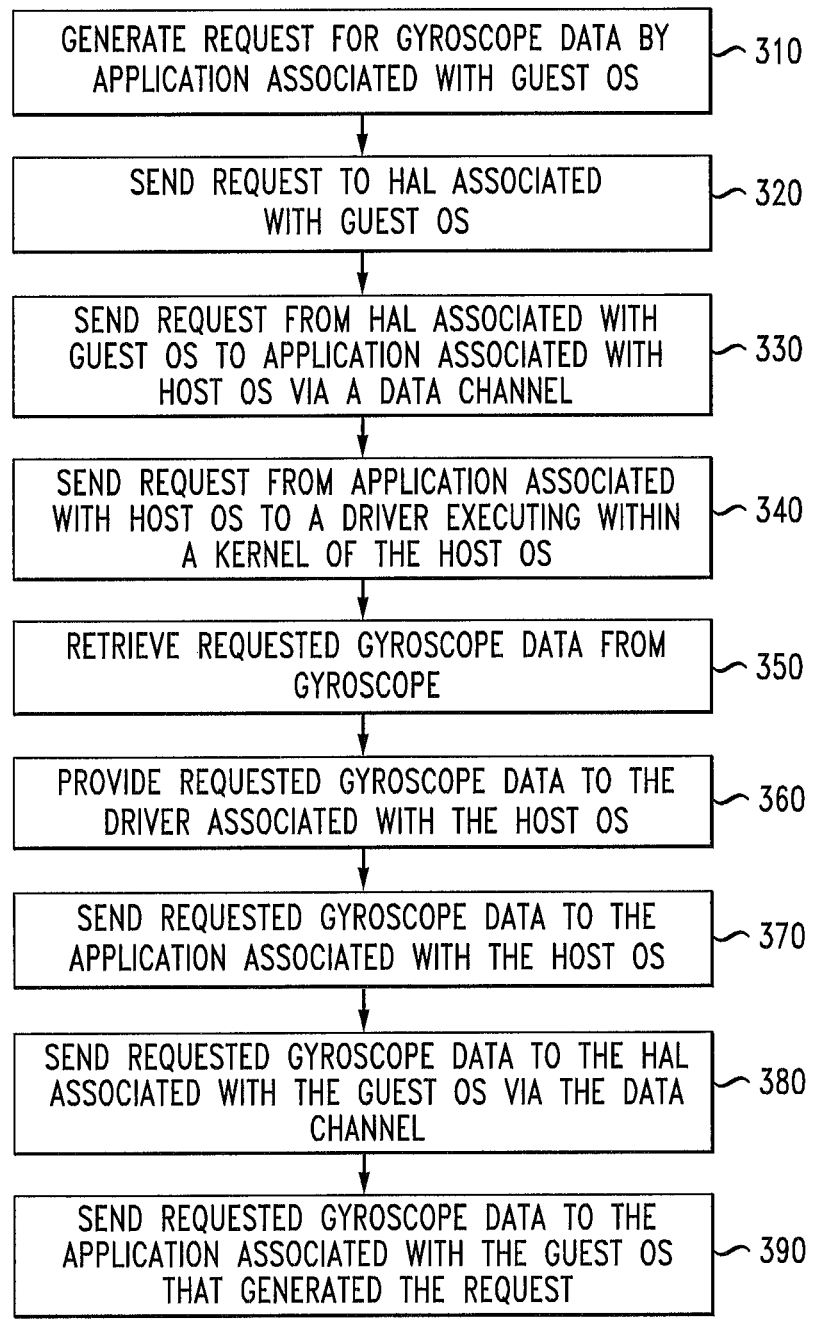
FIG. 3 is a flow chart illustrating a method for emulating a gyroscope in a guest operating system from a host operating system according to an illustrative embodiment.

FIG. 3 illustrates a method for emulating a gyroscope to a guest operating system by a host operating system according to an illustrative embodiment. It should be understood that the steps or other interactions of the illustrated method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on computer-readable storage device, excluding a propagating signal.

Referring to FIG. 3, a request for gyroscope data is generated at step 310 by an application associated with the guest operating system, e.g., the rotation detection application 130. The guest operating system is a virtual operating system executing as a guest of the host operating system. At step 320, the request is sent to hardware abstraction layer associated with the guest operating system, e.g., the hardware abstraction layer 160. At step 330, the request is sent from the hardware abstraction layer to an application associated with the host operating system, e.g., the application 105. The request may be sent via a data channel 115. At step 340, the request is sent from the application associated with the host operating system to a driver executing within a kernel of the host operating system, e.g., the driver 123. At step 350, the requested gyroscope data is retrieved from a gyroscope associated with the hardware 180.

At step 360, the retrieved gyroscope data is provided to the driver, e.g., the driver 123. At 370, the retrieved gyroscope data is provided from the driver to the application associated with the host operating system, e.g., the application 105. At step 380, the retrieved gyroscope data is sent from the application associated with the host operating system to the hardware abstraction layer associated with the guest operating system, e.g., the hardware abstraction layer 160. At step 390, the retrieved gyroscope data is sent to the application of the guest operating system that sent the request, e.g., the rotation detection application 130.

Although not shown, it should be appreciated that a request from an application associated with the host operating system, e.g., the Windows OS, for accessing resources associated with the host operating system may be fulfilled in a conventional way, e.g., by routing the request from a driver to the hardware via the Windows hardware abstraction layer and fulfilling the request via the hardware abstraction layer and the driver.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method for providing a guest operating system with access to a gyroscope associated with a computing device including a processor executing a host operating system, comprising:

generating a request for gyroscope data by a first application associated with the guest operating system, wherein the guest operating system is launched as a virtual operating system executed as a guest of the host operating system;

receiving the request at a hardware abstraction layer associated with the guest operating system;

sending the request from the hardware abstraction layer associated with the guest operating system to a second application executed by the processor in a user mode layer associated with the host operating system;

sending the request from the second application to a driver executing within a kernel of the host operating system, wherein the driver retrieves the requested gyroscope data from the gyroscope;

sending the retrieved gyroscope data from the driver to the second application;

sending the retrieved gyroscope data from the second application to the hardware abstraction layer associated with the guest operating system; and sending the retrieved gyroscope data from the hardware abstraction layer to the first application.

2. The method of claim 1, wherein the request is sent from the hardware abstraction layer to the second application via a data channel.

3. The method of claim 1, wherein the retrieved gyroscope data is sent to the hardware abstraction layer from the second application via a data channel.

4. The method of claim 1, wherein the first application is a rotation detection application.

5. The method of claim 1, wherein the guest operating system is an Android operating system.

6. The method of claim 1, wherein the host operating system is a Windows operating system.

7. A computing device, comprising:

a processor; and a memory having stored thereon instructions which, when executed by the processor, cause the processor to perform operations comprising:

executing a host operating system;

executing an application for launching a guest operating system, wherein the guest operating system is a virtual operating system executed as a guest of the host operating system;

generating a request for gyroscope data by a first application associated with the guest operating system;

receiving the request at a hardware abstraction layer associated with the guest operating system;

sending the request from the hardware abstraction layer associated with the guest operating system to a second application executed by the processor in a user mode layer associated with the host operating system;

sending the request from the second application to a driver executing within a kernel of the host operating system, wherein the driver retrieves the requested gyroscope data from the gyroscope;

providing the retrieved gyroscope data to the second application via the driver;

sending the retrieved gyroscope data from the second application to the hardware abstraction layer associated with the quest operating system; and sending the retrieved gyroscope data from the hardware abstraction layer to the first application.

8. The computing device of claim 7, wherein the request is sent from the hardware abstraction layer to the second application via a data channel.

9. The computing device of claim 7, wherein the retrieved gyroscope data is sent from the second application to the hardware abstraction layer via a data channel.

10. The computing device of claim 7, wherein the first application is a rotation detection application.

11. The computing device of claim 7, wherein the guest operating system is an Android operating system.

12. The computing device of claim 7, wherein the host operating system is a Windows operating system.

13. A computer readable storage device having instructions encoded thereon which, when executed by a processor, cause the processor to perform operations comprising:

executing a host operating system;

executing an application for launching a guest operating system, wherein the guest operating system is a virtual operating system executed as a guest of the host operating system;

generating a request for gyroscope data by a first application associated with a guest operating system;

receiving the request at a hardware abstraction layer associated with the guest operating system;

sending the request from the hardware abstraction layer associated with the guest operating system to a second application executed by the processor in a user mode layer associated with the host operating system;

sending the request from the second application to a driver executing within a kernel of the host operating system, wherein the driver retrieves the requested gyroscope data from the gyroscope;

providing the retrieved gyroscope data to the second application via the driver;

sending the retrieved gyroscope data from the second application to the hardware abstraction layer associated with the guest operating system; and sending the retrieved gyroscope data from the hardware abstraction layer to the first application.

14. The computer readable storage device of claim 13, wherein the request is sent from the hardware abstraction layer to the second application via a data channel.

15. The computer readable storage device of claim 13, wherein the retrieved gyroscope data is sent to the hardware abstraction layer from the second application via a data channel.

16. The computer readable storage device of claim 13, wherein the first application is a rotation detection application.

17. The computer readable storage device of claim 13, wherein the guest operating system is an Android operating system, and the host operating system is a Windows operating system.

* * * * *